C. T. MADSEN.
COFFEE POT.
APPLICATION FILED OCT. 30, 1918.

1,305,822.

Patented June 3, 1919.

INVENTOR
Chresten T. Madsen
BY
Strong & Townsend
ATTORNEYS

UNITED STATES PATENT OFFICE.

CHRESTEN TORBEN MADSEN, OF OAKLAND, CALIFORNIA.

COFFEE-POT.

1,305,822.  Specification of Letters Patent.  Patented June 3, 1919.

Application filed October 30, 1918. Serial No. 260,231.

*To all whom it may concern:*

Be it known that I, CHRESTEN T. MADSEN, a citizen of the United States, residing at Oakland, in the county of Alameda and State of California, have invented new and useful Improvements in Coffee-Pots, of which the following is a specification.

This invention relates to a coffee pot and particularly to a percolating attachment therefor. One of the objects of the present invention is to provide a simple and cheaply manufactured coffee pot which is so constructed that a percolating action may take place while the coffee is being boiled.

Another object of the invention is to provide means for increasing the heating area of the pot and to so arrange the percolating mechanism that the whole interior of the coffee pot may be readily cleaned when desired. Further objects will hereinafter appear.

The invention consists of the parts and the construction, combination and arrangement of parts as hereinafter more fully described and claimed, having reference to the accompanying drawings in which—

Figure 1:
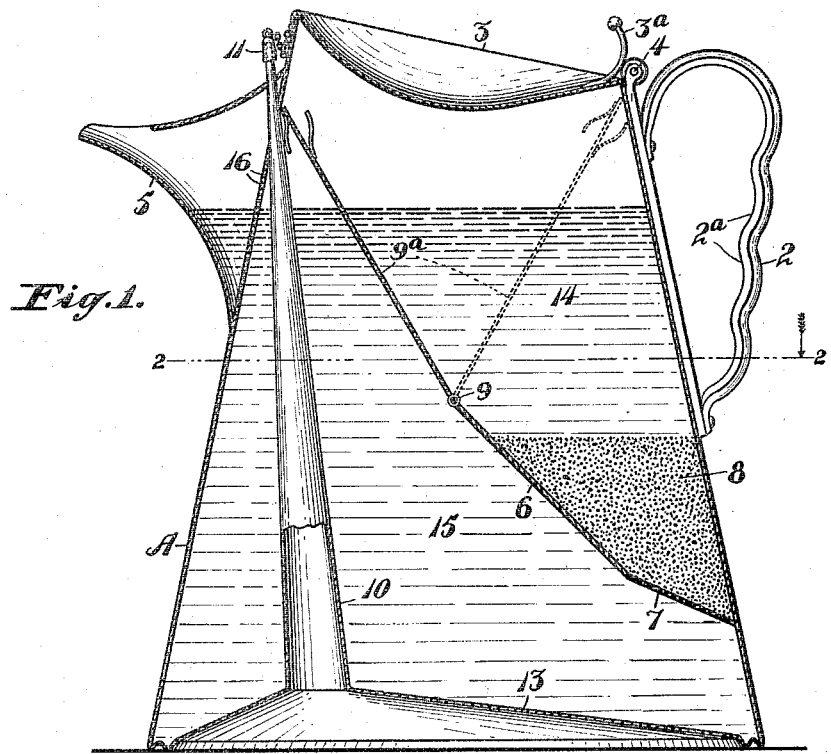
Figure 1 is a central vertical section thrugh the coffee pot.
Figure 2:
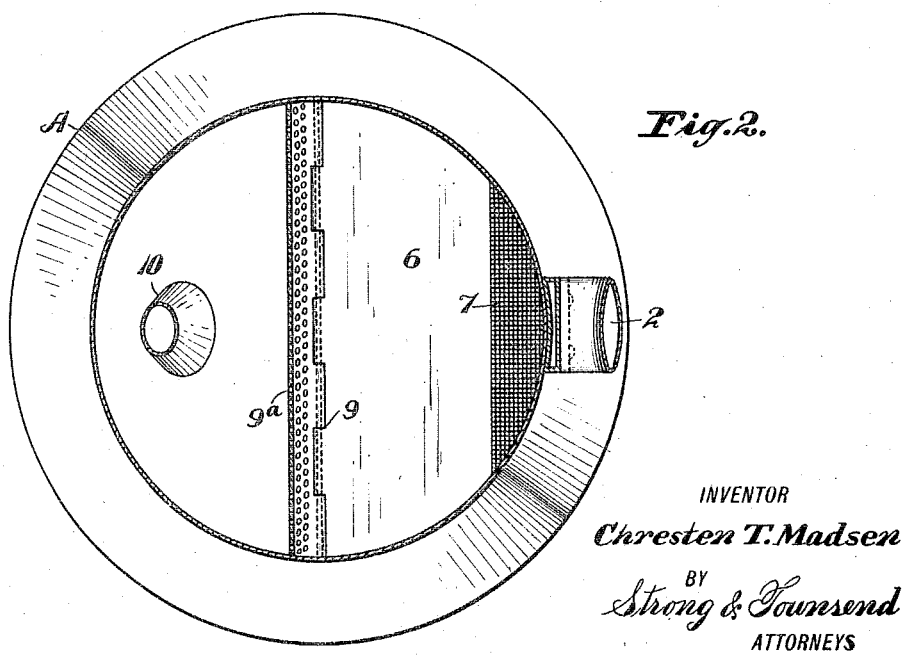
Fig. 2 is a cross section on line 2—2, Fig. 1.

Referring to the drawings in detail, A indicates a cylindrical cone-shaped coffee pot provided with a handle 2, a lid 3 which is pivotally attached to the pot as at 4, and a spout 5 of the usual construction.

Extending crosswise of the pot and positioned interior thereof, is a stationary partition member 6, the bottom portion of which is perforated as at 7. The partition member 6 is positioned on an incline and therefore forms a pocket for the reception of the coffee generally indicated at 8. Hingedly secured to the upper end of the partition plate 6, as at 9, is a strainer 9ª. This strainer normally assumes the position shown by full lines, see Fig. 1, or it may be swung over to the dotted position if it is desired to clean out the pot.

The coffee pot is provided with a bottom section 13 and it is also provided with a flue 10 which passes through the interior chamber of the pot and through the spout 5. This flue is elliptical in cross section, and is provided for the purpose of increasing the heating area on one side of the pot so as to create an upward or thermo-siphon circulation through the screen 9 and the coffee contained in the pocket formed by the inclined cross plate 6. The excess heating area provided on one side constantly maintains a circulation through the coffee contained in the pocket, thereby producing the percolating action desired, this circulation being maintained as long as the water level stands above the hinge 9 or the lower portion of the screen supported thereby. The upper end of the tube 10 may be provided with a cap 11 to increase or decrease the temperature thereof; that is, the tube 10 will conduct more heat when the cap is removed as the draft created thereby will considerably increase the temperature within the tube; similarly, closure of the tube by replacing the cap will prevent any draft and will therefore reduce the temperature in the tube so that the boiling or circulation obtained is less violent. The interior of the coffee pot is in reality divided into two chambers indicated at 14 and 15, the chamber 15 containing the pure coffee while the chamber 14 contains coffee and grounds, and as the spout 5 is connected with the chamber 15, it can readily be seen that only pure or strained coffee will be obtained as all coffee grounds will be retained in the chamber 14 by the perforated bottom 7 and the screen 9ª. A screen such as shown at 16 may also be placed in the spout, if desired, to positively prevent any grounds from passing out of the pot when coffee is being poured therefrom. The lid 3, while constructed in the usual manner, is preferably provided with a thumb piece 3ª to permit it to be readily opened or closed and while the handle is here shown, as provided with finger grips 2ª, it is obvious that any suitable form of handle may be employed and that it may be secured by screws or rivets, as desired.

I also wish it understood that the material and finish of the several parts otherwise employed may be such as the experience and judgment of the manufacturer may dictate.

Having thus described my invention, what I claim and desire to secure by Letters Patent is—

1. A coffee pot comprising a container, a pocket formed interiorly of said container for the reception of coffee, said pocket having a perforated bottom, a screen cover hingedly secured to the upper end of the pocket for swinging to either side of the center of the coffee pot to divide the same into two variable sized chambers, and means arranged exclusively within one chamber for maintaining a circulation of water through said screen and the perforated bottom formed in the pocket for the reception of the coffee.

2. A coffee pot comprising a container, a solid-walled pocket formed interiorly of said container for the reception of coffee, said pocket having a perforated bottom, a screen cover hingedly secured to the upper end of the pocket to divide the coffeepot into two chambers, a tube extending through one of said chambers exterior of the pocket, said tube serving as a flue for the escape of heat when the coffee pot is placed over a fire and also serving the function of excessively heating liquid contained within the pot so as to maintain a thermo-siphon circulation of the liquid through the coffee contained in the pocket.

3. A coffee pot comprising a container, a coffee receiving pocket therein perforated for the circulation of liquid therethrough, a hot-air conducting tube passing through the container for heating the contents, and means for regulating the intensity of the heat in said tube.

4. A coffee pot comprising a container, a coffee receiving pocket therein perforated for the circulation of liquid therethrough, a heating tube extending from the bottom of the container through its upper portion and tapering in an upward direction to restrict the flow of heat therethrough, and a closure member movably arranged on the upper end of the tube.

5. A coffee pot comprising a container having an eccentrically disposed opening in its bottom, the latter being of inverted dished formation, a heating tube leading from the bottom opening up through the container, and a coffee-receiving pocket disposed on the side of the container opposite the tube.

6. A coffee pot comprising an open top container formed with a pocket on its side wall provided with a foraminous bottom and a perforated top mounted to swing to either side of the center of the container to close the pocket and open the container to enable access through the open top in one position of the perforated top and to open the pocket and close the container in its other position.

7. A coffee pot comprising a container formed with a pocket on its side wall provided with a foraminous bottom and a perforated top mounted to swing to either side of the center of the container to open and close the pocket and to close and open the container, respectively, and a lid for the container having a portion extending into the path of the swingable top to arrest the latter from swinging from one position to the other.

8. A coffee pot comprising a container formed with a pocket on its side wall provided with a foraminous bottom and a perforated top mounted to swing to either side of the center of the container, a lid for the container having a portion extending into the path of the swingable top, and a heat-conducting tube passing through the container exterior of the pocket.

9. A coffee pot comprising a container having a pouring spout, a heat-conducting tube opening through the bottom of the container and extending upwardly through the latter and through said spout, and a pocket disposed on the wall at the opposite side of the container.

In testimony whereof I have hereunto set my hand in the presence of two subscribing witnesses.

CHRESTEN TORBEN MADSEN.

Witnesses:
W. W. HEALEY,
M. E. EWING.